(12) United States Patent
Kubala

(10) Patent No.: US 7,692,553 B2
(45) Date of Patent: Apr. 6, 2010

(54) LEAK DETECTING SYSTEM FOR ROTATING UNION

(75) Inventor: Zbigniew Kubala, Beach Park, IL (US)

(73) Assignee: Deublin Company, Waukegan, IL (US)

( * ) Notice: Subject to any disclaimer, the term of this patent is extended or adjusted under 35 U.S.C. 154(b) by 777 days.

(21) Appl. No.: 11/490,625

(22) Filed: Jul. 21, 2006

(65) Prior Publication Data

US 2008/0016950 A1 Jan. 24, 2008

(51) Int. Cl.
*G08B 21/00* (2006.01)
(52) U.S. Cl. .................. 340/605; 285/121.1; 73/37; 73/40
(58) Field of Classification Search ............... 340/605, 340/679, 686.1, 686.3; 285/121.1, 123.12, 285/95; 73/40, 40.5 A, 37, 37.8, 52
See application file for complete search history.

(56) References Cited

U.S. PATENT DOCUMENTS

| | | | |
|---|---|---|---|
| 3,485,085 A | 12/1969 | Hawkins, Jr. | |
| 4,094,512 A | 6/1978 | Back | |
| 4,126,857 A | 11/1978 | Lancia et al. | |
| 4,319,232 A | 3/1982 | Westphal et al. | |
| 4,424,973 A | 1/1984 | Heilala | |
| 4,458,521 A | 7/1984 | Pillette | |
| 4,557,139 A | 12/1985 | Cantwell et al. | |
| 4,573,344 A | 3/1986 | Ezekoye | |
| 4,631,952 A | 12/1986 | Donaghey | |
| 4,780,665 A * | 10/1988 | Mitchell | 324/695 |
| 4,803,869 A | 2/1989 | Barcelona et al. | |
| 4,817,995 A | 4/1989 | Deubler et al. | |
| 4,831,493 A | 5/1989 | Wilson et al. | |
| 4,845,472 A | 7/1989 | Gordon et al. | |
| 4,888,455 A | 12/1989 | Hanson | |
| 4,928,997 A | 5/1990 | Reisener et al. | |
| 4,976,282 A | 12/1990 | Kubala | |
| 5,014,543 A | 5/1991 | Franklin et al. | |
| 5,058,421 A | 10/1991 | Alexander et al. | |
| 5,072,948 A | 12/1991 | Kostrzewski | |
| 5,101,657 A | 4/1992 | Lahlouh et al. | |
| 5,153,564 A | 10/1992 | Hoiberg | |
| 5,190,069 A | 3/1993 | Richards | |
| 5,229,750 A | 7/1993 | Welch, Jr. et al. | |
| 5,315,291 A | 5/1994 | Furr | |

(Continued)

FOREIGN PATENT DOCUMENTS

FR 2 631 098 A1 11/1989

(Continued)

*Primary Examiner*—Davetta W Goins
*Assistant Examiner*—Edny Labbees
(74) *Attorney, Agent, or Firm*—Leydig, Voit & Mayer, Ltd.

(57) ABSTRACT

An integrated leak detection system for a rotating union provides improved leak detection and user convenience. In an embodiment of the invention, the system provides a leak detection sensor located within the union, and in an embodiment of the invention the detection sensor is located beyond a back-up seal system. In an embodiment of the invention, the sensor and processing electronics are integral to the union housing. In yet another embodiment of the invention, the detection sensor is substantially symmetrically configured to detect leakage into a protected area regardless of orientation of the union. In an embodiment of the invention, the fluid being conveyed is electrically conductive and the detection sensor comprises an electrical conductivity sensor.

33 Claims, 5 Drawing Sheets

U.S. PATENT DOCUMENTS

| | | | |
|---|---|---|---|
| 5,353,830 A * | 10/1994 | Mochizuki et al. | 137/240 |
| 5,357,241 A | 10/1994 | Welch, Jr. et al. | |
| 5,440,917 A | 8/1995 | Smith et al. | |
| 5,444,379 A | 8/1995 | Ohmi et al. | |
| 5,463,377 A | 10/1995 | Kronberg | |
| 5,546,009 A | 8/1996 | Raphael | |
| 5,562,406 A | 10/1996 | Ooka et al. | |
| 5,617,879 A * | 4/1997 | Kubala | 285/95 |
| 5,669,636 A | 9/1997 | Kubala | |
| 5,922,941 A | 7/1999 | Winkler et al. | |
| 5,967,716 A | 10/1999 | Katsuzawa et al. | |
| 6,147,613 A | 11/2000 | Doumit | |
| 6,164,316 A | 12/2000 | Betti | |
| 6,310,555 B1 | 10/2001 | Stern | |
| 6,330,525 B1 | 12/2001 | Hayes et al. | |
| 6,339,951 B1 | 1/2002 | Kashmiri et al. | |
| 6,422,822 B1 | 7/2002 | Holmes | |
| 6,526,807 B1 | 3/2003 | Doumit et al. | |
| 6,592,126 B2 | 7/2003 | Davis | |
| 6,626,436 B2 | 9/2003 | Pecht et al. | |
| 6,725,705 B1 * | 4/2004 | Huebler et al. | 73/40.5 A |
| 6,776,261 B2 | 8/2004 | Eriksen et al. | |
| 6,987,458 B1 | 1/2006 | Limmer | |
| 2004/0200670 A1 | 10/2004 | Jakob et al. | |
| 2005/0235306 A1 * | 10/2005 | Fima | 725/10 |
| 2007/0034265 A1 | 2/2007 | Mohr et al. | |

FOREIGN PATENT DOCUMENTS

| | | |
|---|---|---|
| GB | 2312287 A * | 10/1997 |
| JP | 2004-028164 | 1/2004 |
| JP | 2004-136411 | 5/2004 |
| JP | 2005-249008 | 9/2005 |

* cited by examiner

LEAK DETECTING SYSTEM FOR ROTATING UNION

TECHNICAL FIELD OF THE INVENTION

The present invention relates generally to the detection of leaks with respect to rotating unions, and more specifically, to an integrated system for detecting unwanted potentially harmful leakage out of the union.

BACKGROUND OF THE INVENTION

The invention pertains generally to leak detection with respect to rotating unions. As used herein, the term "rotating union" refers primarily to a mechanical device used to transfer fluid from a stationary source such as a pipe or hose into a rotating element such as a machine tool spindle or rotating drums found on printing presses and stock calendering machines. A rotating union typically comprises a stationary member, called the housing, that has an inlet port for receiving fluid under pressure, and a rotating member, called a rotor, that has a central passage with an outlet port for delivering fluid into a rotating component. One typical feature of such rotating unions is the ability when working properly to transfer fluid without significant leakage between the stationary and rotating portions.

Rotating unions are used in many industrial settings, including, for example, CNC machining centers, modern printing presses, and other similar industrial environments. The primary usage in such cases is to convey high pressure and/or high volume coolant for use by the process. Coolants used may be water, water-based, or otherwise. The unions and associated equipment taken together can comprise many high precision components such as gears, bearings, couplings, electronic components, etc. that are expensive and/or difficult to replace, and that may be subject to severe corrosion or electric damage if exposed to fluid leaking from the union. In applications wherein the conveyed fluid contains chemical additives, a spill or leakage may present a health risk to operating personnel as well as an environmental hazard.

There are a number of different types of rotating unions on the market. The two general categories are (1) seals that are permanently closed, and (2) so-called "pop-off" seals where the seal may be designed to automatically open the contact between the seal faces when the pressure of the conveyed fluid is absent. Both types are subject to seal wear and eventual failure. The latter type of seal has the advantage of no seal wear in the absence of fluid pressure, but typically exhibits a slight amount of leakage at every shut-down and start-up cycle, such as when automatic tool change occurs in CNC machining systems. For this reason, rotating unions typically incorporate a housing that surrounds the primary seal and one or more drain ports to evacuate the leaked fluid. In addition, rotating unions generally include a back-up seal system between the primary seal (i.e., the seal normally in contact with the conveyed fluid) and any area, such as a bearing chamber, that is to be kept dry. Typical back-up seal systems include one or more labyrinths, air curtains, and lip seals mounted in association with the rotating part of the union. The following U.S. patents describe various details of several types of rotating unions, and are incorporated herein by reference for all that they teach and disclose without exclusion of any portion thereof: U.S. Pat. Nos. 6,164,316; 5,669,636; 5,617,879; 4,976,282; 4,928,997; and 4,817,995.

Once leaked fluid breaches the back-up seal system, the types of damage discussed above often begin to occur. To avoid unnecessary damage, it has long been a goal of manufacturers and users of rotating unions to ensure to the extent possible that rotating unions do not allow excess leakage of fluid. The initial source of such leakage, when it occurs, is the internal seal that provides an interface between rotating (spindle, draw bar, hollow shaft, etc.) and stationary (pipe, tube, hose, etc.) parts while allowing the passage of fluid between the parts. In particular, leakage is typically due to gradual or catastrophic deterioration of this seal. Since, to date, there is no such seal that is not subject to at least eventual wear and replacement, it is important in general to promptly detect leakage within the rotating union when it occurs so that appropriate maintenance may be undertaken before consequential related damage occurs.

At the same time, it is also desirable to minimize the degree to which the leak detecting system gives "false alarms." That is, if the leak detecting system triggers upon the detection of acceptable levels of leakage, such as may be present during ordinary operation for purposes of lubricating the rotating seal etc., then such system will likely be deactivated or desensitized by operating personnel. This, however, creates a strong risk of eventual undetected harmful leakage.

There have been certain attempts, none completely successful, to solve the aforementioned problems. For example, one type of leak detection system in use as of the date of filing of this application employs a calorimetric sensor situated between the primary seal and the back-up seal system. Other systems appear to employ as of the date of filing of this application a leakage sensor that analyzes the output of the leakage drain port. As will be appreciated from the following description, none of the known existing systems of leak detection provide the necessary level of safety that many embodiments of the present invention are able to provide. In addition, commercially available leakage detection systems are awkward in that their principles of operation and basic configurations force them to rely on extensive external equipment to sense leakage and/or process detection signals.

BRIEF SUMMARY OF THE INVENTION

Embodiments of the invention generally alleviate the aforementioned shortcomings and provide the user with an improved system for detecting leakage before consequential damage can occur. As noted above, there exist different types of rotating unions, including those having permanently closed seals as well as the pop-off type unions wherein the seals automatically open in the absence of fluid pressure. Such unions typically comprise a housing surrounding the primary seal. Finally, rotating unions generally also include a back-up seal system (e.g., one or more labyrinths, air curtains, and/or lip seals) between the primary seal and the area that is to be kept dry. Early and accurate detection of unwanted leakage within rotating unions is an urgent and unmet need of modern industry.

In an embodiment of the invention, the leak detection system comprises a leakage sensor element (or a multi-part array) located within the housing, wherein the sensor element array is angularly symmetric about the axis of rotation in the form of a ring (or substantial portion thereof) or other substantially symmetric sensor or sensor array. In this manner, the sensor in an embodiment of the invention is able to detect the leaked medium of interest if present in the protected area regardless of the orientation of the union during use. In a preferred embodiment of the invention, the back-up seal system is located between the sensor and primary seal system, although in an alternative embodiment of the invention the sensor may be located elsewhere. Although in an embodiment of the invention the fluid (typically a liquid although the invention is useful for other substances as well, such as gaseous or misted substances) is electrically conductive and the sensing element is an electrical conductivity sensor, such is not required in every embodiment of the invention. All references herein to conductivity refer to electrical conductivity.

One symmetric sensor element usable in an embodiment of the invention is a substantially complete ring of conducting material having an insulating coating with a number of gaps therein spaced generally uniformly, if not necessarily precisely uniformly, about the circumference of the ring. The insulating coating separates the ring of conducting material from the union housing. However, in the event of a leak, the leaked fluid can bridge the ring of conducting material to the union housing, completing a detection circuit.

When the rotating shaft (e.g., rotor) is supported within the housing by two or more bearing assemblies, the sensor element may be placed between the bearings according to an embodiment of the invention. In a further embodiment of the invention, the space between the bearings also comprises a filler assembly for directing leakage to the sensor element for detection.

In a further embodiment of the invention, the system includes a leakage sensor located within the housing to detect leakage of the cooling liquid, and also includes a visual indicator mounted on the housing and linked to the sensor to signal the user regarding the detected leakage. In a further embodiment of the invention, the system further comprises a second visual indicator mounted on the housing to indicate that the leakage sensor is operational. For example, the second visual indicator can indicate that the sensor is not powered due to power supply failure or failure of one or more connections. In a further embodiment of the invention, the leak detecting system includes a link to a remote indicator such as a light, an LED, or a computer generated visual display.

In a further embodiment of the invention, the leak detecting system includes a sensor processing module that is integral with the union housing. The sensor processing module produces an electrical signal to indicate the presence of leakage of the coolant within the housing at the location of the sensor element. In an embodiment of the invention, the sensor processing module resides in an encasement secured to the housing, In an alternative embodiment of the invention, the sensor processing module resides in a cavity within the housing itself. The sensor processing module provides one or more of the types of alerts described above in various embodiments of the invention. The sensor element configuration and arrangement may be dictated by designer preference, however, in an embodiment of the invention the sensor is as described above.

Further features, details, and advantages of embodiments of the invention will become apparent from the following description.

DETAILED DESCRIPTION OF THE INVENTION

Figure 1:
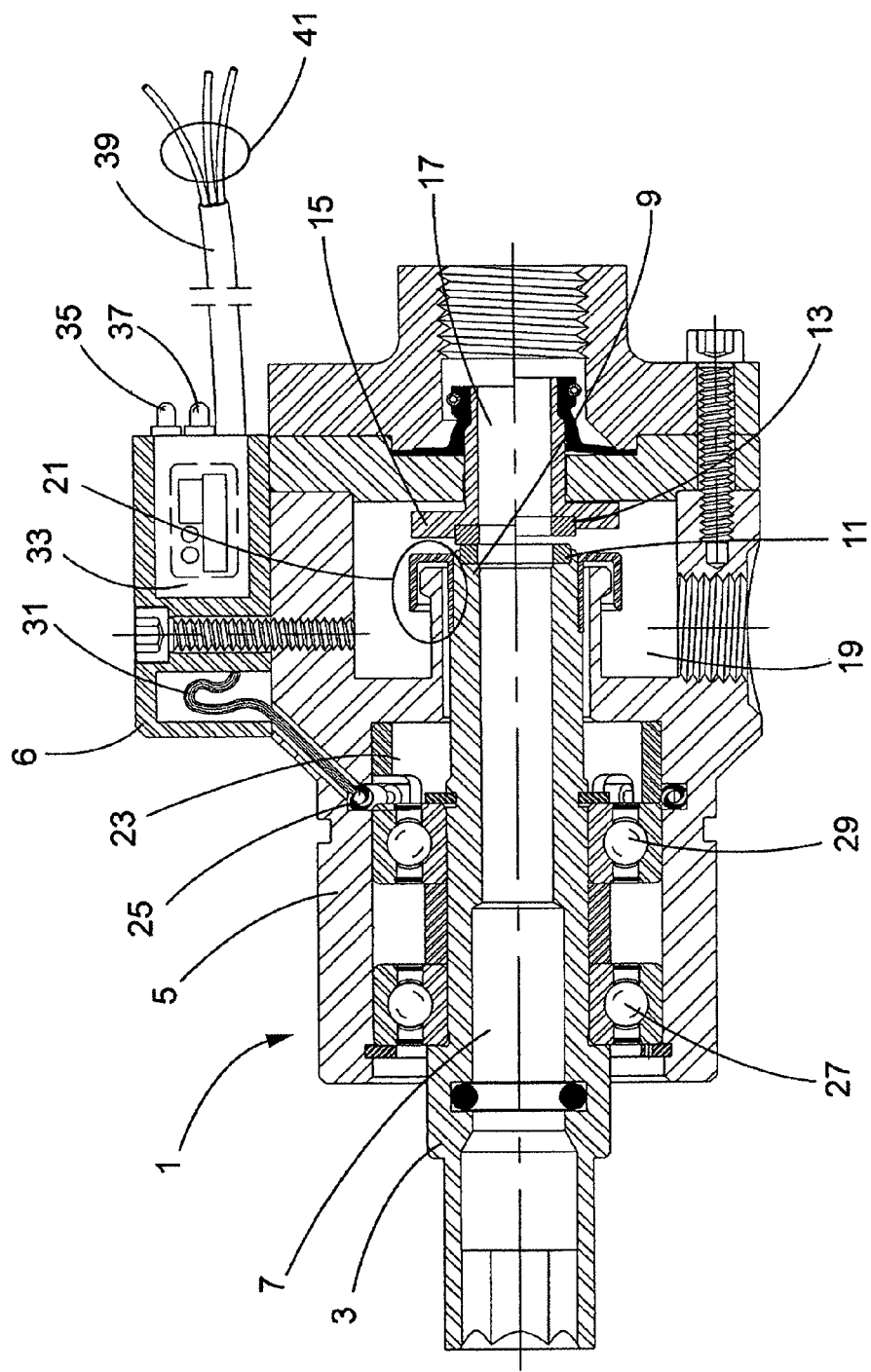
FIG. 1 is a cross-sectional side view of a housing-supported rotating union having a leakage sensor on the dry side of a labyrinth back-up seal and having an integrated sensor processing module according to an embodiment of the invention.

As discussed above, rotating unions are susceptible to leakage due to seal failure. Such failure may be due to gradual wear or to more drastic erosion, such as may be caused by particulate contamination (e.g., machining chips) in the fluid being conveyed, excessive pressure in the conveyed fluid, extended rotation without adequate seal lubrication from a conveyed fluid, or other causes. The leakage poses a strong risk of damage to associated components and machinery such as gears, bearings, couplings, electronic components, etc. that may be expensive and/or difficult to replace, and in some cases the leakage may present a health risk to operating personnel as well.

Existing rotating union leakage detection systems attempt to provide a warning of leakage to prevent the consequential damage that leakage can cause, however, no solution to date has effectively overcome the many problems inherent in such systems. Existing leak detection systems that provide a conductivity sensor associated with the housing drain line as described above, for example, exhibit problems with orientation-dependence and sensitivity. In particular, such systems tend to trigger too frequently due to normal allowable leakage from the rotating seal. There will almost always be a small amount of leakage even during normal operation, and this aids in lubricating the seal faces. This type of leakage does not pose a risk of damage as described above, and by being triggered by this type of leakage, the system often forces users to lower the system sensitivity. However, this raises the risk that the sensitivity will now be too low to detect abnormal leakage, i.e., leakage of an amount that may result in damage. With respect to orientation-dependent operation, such systems may malfunction, i.e., fail to detect substantial leakage, if the drain line is pointed upward, since typically the drain line is operated via gravity.

Other solutions exhibit similar problems. For example, a traditional calorimetric sensor installed within the housing adjacent to the primary seal will miss detection of fluid that falls past the sensor (and then out of the drain line or into the bearings or other machinery) if the union is used at a certain orientation. In addition, since the sensor is installed right next to the primary seal, it poses, however to a lesser degree compared to the drain line sensors, the opposite risk of also triggering on the detection of normal leakage and causing user interference or indifference. In addition, to the extent that this type of system is useful at all, it will only operate practically in the environment of a permanently closed seals rather than a pop-off seal.

The leak detecting system provided in various embodiments of the invention alleviates the disadvantages of existing systems. In particular, as will be described, in an embodiment of the invention, the sensor is designed and configured to provide orientation independent operation and to detect leakage directly in the area of interest without triggering on normal incidental leakage. Moreover, embodiments of the invention provide a unitary rotating union with integrated leak detection sensor and processing.

FIG. 1 is a cross-sectional side view of a housing-supported rotating union having a leakage sensor on the dry side of a labyrinth back-up seal and having an integrated sensor processing module in an attached secondary housing according to an embodiment of the invention. In greater detail, the rotating union 1 comprises a rotor 3 supported within a housing 5 for rotation with respect to the housing 5. In the illustrated example, the rotor 3 is supported within the housing 5 by a pair of ball bearing assemblies 27, 29. Although these assemblies 27, 29 are illustrated as comprising ball bearings, it will be appreciated that other types of bearing such as needle bearings, thrust bearings, etc. may be used additionally or alternatively. Moreover, although only two such assemblies 27, 29 are illustrated, it will be appreciated that the number and type of bearing assemblies will be controlled by manufacturer preference and intended use environment.

The rotor 3 comprises an internal passage 7 for conducting a liquid, such as a coolant, through the rotor 3. The rotor 3 has a terminal end 9 within the housing 5 that supports an annular rotating seal 11. The rotating seal 11 is affixed to the terminal end 9, and coaxially abuts a stationary annular seal 13 that is fixed to a stationary conduit 15 having therein a passage 17. The rotating seal 11 and stationary seal 13 seal against each other during normal operation such that a liquid can pass through the assembly, i.e., between the first 7 and second 17 passages without leaking substantially into the annular space 19 surrounding the seals 11, 13. Herein, the combination of the two annular seals 11, 13 will sometimes be referred to as the "primary" seal.

As discussed, a rotating union may experience some level of "normal" leakage during operation and during the cycling of fluid pressure, such as during tool changes and as a result of normal seal lubrication. As such, the rotating union 1 as illustrated also comprises a secondary or "back-up" seal system 21. In the illustrated embodiment, the back-up seal system comprises a labyrinth. However, those of skill in the art will appreciate that there are a number of such seal systems usable in embodiments of the invention, including labyrinths (also known as slingers), air curtains, lip seals, etc. The purpose of the back-up seal system 21 is to protect the dry side 23 of the system, where leakage is not desired or normally expected, from the potentially "wet" side 19 of the system, where normal leakage can be expected.

According to an embodiment of the invention as illustrated in FIG. 1, the rotating union 1 also comprises a leak detecting system comprising a sensor element 25 located within the housing 5. The sensor element 25 is illustrated in cross-section as a ring, which will be discussed in greater detail with reference to FIG. 2. As illustrated, in a preferred embodiment of the invention the sensor 25 is located on the dry side 23 of the back-up seal system 21 and between the nearest bearing assembly 29 and the back-up seal system 21. In this configuration, the sensor 25 is able to sense leakage at the earliest opportunity before it reaches the bearing assemblies 27, 29. However, in alternative embodiments of the invention, the sensor 25 is located elsewhere, such as, without limitation, between the bearing assemblies 27, 29 or closer to the back-up seal system 21.

It should be noted that the ring sensor 25 has an inner conductor that is separated from direct contact with the housing 5 by an outer layer. As will be appreciated by reference to FIG. 2, the sensor is configured to detect leakage, if present, in a symmetric manner, i.e., circularly symmetric or at a plurality of points at substantially angularly symmetric positions surrounding the rotor.

The leak detecting system also comprising an electrical conduit 31 connected to the sensor element 25 for carrying a sense signal indicating detected leakage to a sense signal processing module 33. Although the sense signal processing module 33 is illustrated as externally integrated with the housing 5 via attached encasement 6, it will be appreciated from the remainder of this description that the sense signal processing module 33 may also be integrated internally to the housing 5 in an embodiment of the invention. The sense signal processing module 33, which will be discussed in greater detail with reference to FIG. 5, interfaces with the sensor 25 and provides an output indicating whether leakage has been detected. In the illustrated example, an LED 35 provides the leak detection output. In an embodiment of the invention, the LED 35 lights either continuously or intermittently when leakage is detected. Although the color of the LED 35 is not critical, in an embodiment of the invention the LED 35 is of a red color.

In an embodiment of the invention, a second LED 37 is provided by the module 33 to indicate whether the module 33 is properly powered. The module 33 may be either remotely or locally powered, and in either case, a power interruption may occur due to a connection or wiring fault or a failure of the power source. The power indicator 37 is especially desirable in an embodiment wherein the leak detection signal is a light on, since in this case, the lack of a light due to power failure might otherwise appear to signal a lack of leakage. Although the color of the LED 37 is similarly not critical, in an embodiment of the invention, the LED 37 is of a green color.

In an embodiment of the invention, the signal processing module 33 also comprises an external conduit 39. The illustrated example includes three wires 41, and the purpose of these wires 41 in an embodiment of the invention will be described in greater detail later. In general, external connections may be desired for providing power and for remote signaling of leakage. In an embodiment of the invention, the signal processing module 33 also additionally or alternatively provides a wireless link for communicating with remote computing devices, for example, to report status and/or send alarm indications.

Figure 2:
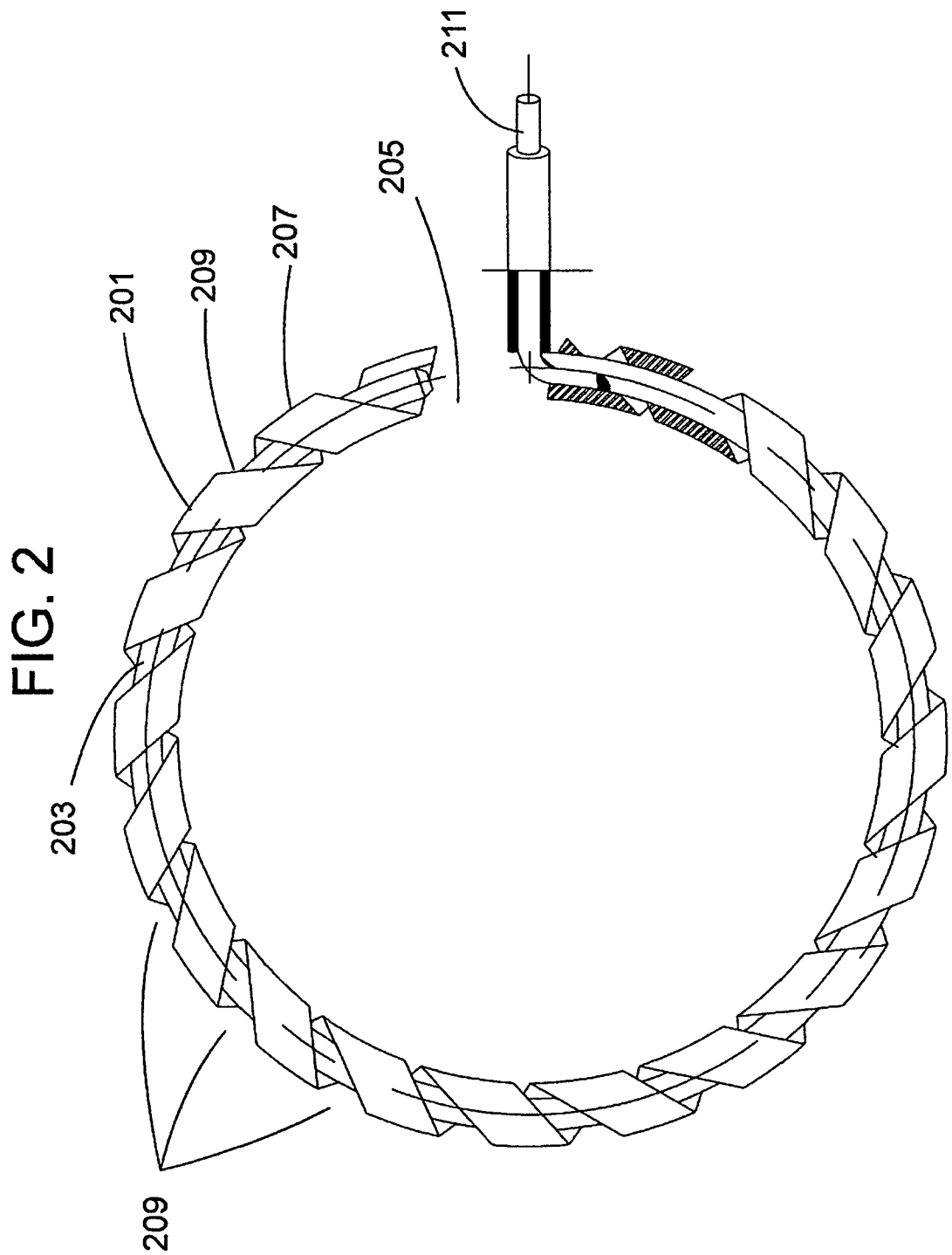
FIG. 2 is a side view of a ring-shaped leakage sensor element according to an embodiment of the invention.

FIG. 2 is a side view of a ring-shaped leakage sensor according to an embodiment of the invention. The sensor 201 comprises ring 203 of conductive material. The ring 203 is shown as open in one location 205 to facilitate handling, such as during installation, and to ease forming, but such a gap 205 is not required. The sensor 201 further comprises an insulating sheath 207. In an embodiment of the invention, the insulating sheath 207 is provided with a number of gaps 209 that expose the inner conductor 203. In the illustrated embodiment of the invention, the insulating sheath 207 is formed by wrapping a ribbon of insulating material about the conductor 205 in a spiral manner, leaving the gaps 209 uncovered. In an alternative embodiment of the invention, the insulating sheath 207 is formed via a series of beads or cylinders of insulating material. In a further embodiment of the invention, the insulating sheath 207 is formed via a tube of insulating material having openings cut therein.

The sensor 201 has a lead 211 attached thereto for connecting the sensor 201 electrically to the sense signal processing module 33. Since the sensor 201 functions by sensing an electrical current between the sensor conductor 203 and the union housing, the lead 211 is preferably insulated so that it cannot make contact with the housing, as this would result in a false signal.

In an embodiment of the invention, the sensor 201 (25) is arranged within the union housing 5 as shown in FIG. 1, i.e., in an encircling arrangement with rotor 3. When installed, the conductor 203 is not physically in contact with the material of the housing 5. The housing is held at electrical ground in an embodiment of the invention and a positive potential is applied to the conductor 203 via the lead 211. During normal operation, no current flows in the lead 211 since there is no path to ground. However, when a substantial leak of conductive fluid occurs and the leakage migrates or flows to the vicinity of the sensor 201, the leaked fluid will form a bridge between the conductor 203 and the material of the housing 5. In this situation, a current will flow in the lead 211 due to the short circuit and the potential difference between the conductor 203 and the housing 5. This current is used, as will be discussed in greater detail below, to cause a leakage signal to be emitted by the sense signal processing module 33 via LED 35.

Although the sensor 201 is illustrated in FIG. 2 as a ring covered intermittently by insulation, it will be appreciated that other substantially symmetric sensors or sensor arrays are possible. For example, the sensor 201 may be replaced in an embodiment of the invention by a symmetric array of individual conductivity sensors. For example, a hexagonal or pentagonal array of individual sensors lying in the same plane as the ring 203 in the former embodiment of the invention may be used. Each individual sensor is preferably similarly configured (i.e., a partially insulated conductor held at a predetermined distance from the housing 5) to sense an increase in conductivity between the sensor and the housing 5. In a further embodiment of the invention, the individual sensors of the array are connected in parallel to the lead 211 such that a current flow caused by a short of any one sensor to the housing 5 will cause a leakage signal to be emitted by the sense signal processing module 33 via LED 35.

Figure 3:
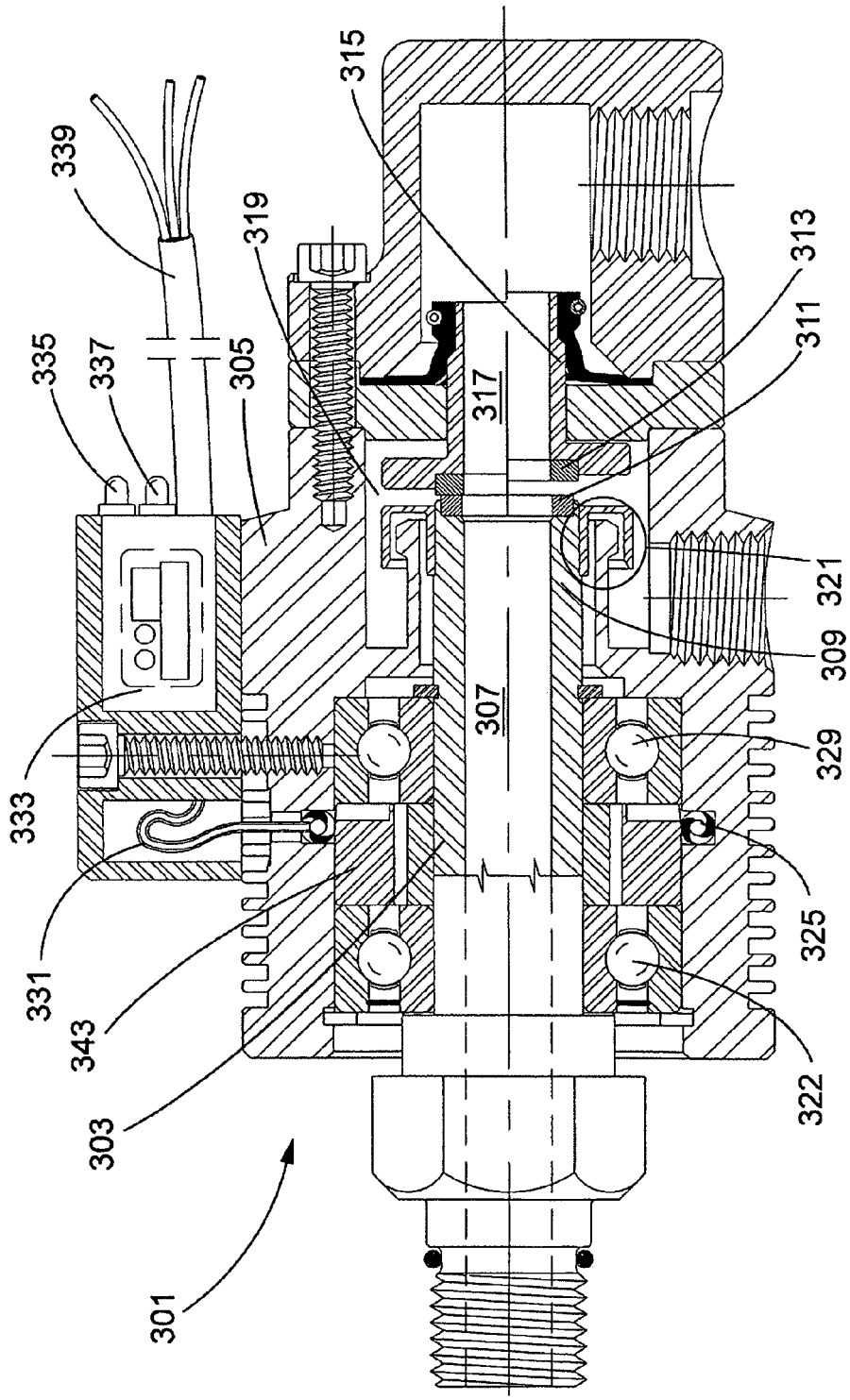
FIG. 3 is a cross-sectional side view of a bearing-supported, rotor-mounted rotating union having a leakage sensor on the dry side of a labyrinth back-up seal as in FIG. 1 and having an integrated sensor processing module according to an alternative embodiment of the invention.
Figure 4:
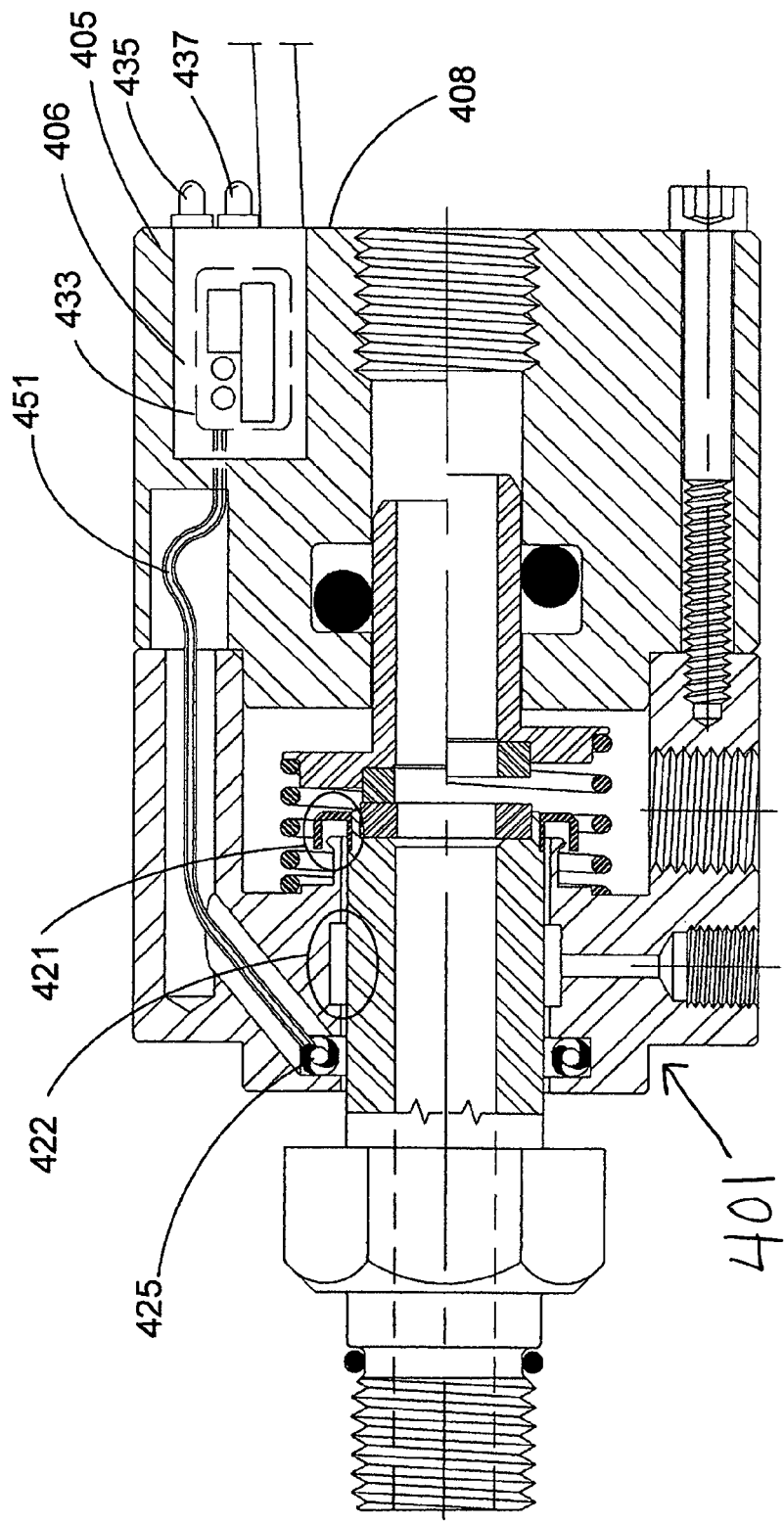
FIG. 4 is a cross-sectional side view of a bearingless rotating union having as back-up seals an air curtain and labyrinth, and having an integrated sensor processing module according to an embodiment of the invention.

Before moving to a discussion of FIG. 3, it should be noted that FIGS. 1, 3, and 4 show different types of rotating unions. In particular, the union of FIG. 1 is configured to be mounted to the associated machine (not shown) via the union housing 5. The union in FIG. 3 is configured to be mounted to the machine (not shown) via a threaded rotor, and both types of union are popular in the market. FIG. 4 illustrates a rotating union wherein the back-up seal system includes both an air curtain and a labyrinth. The illustration of these different types of rotating unions is intended to illustrate an array of example environments, but is not intended to imply that the features described with respect to any of these figures is limited to use with the type of union shown in that figure.

Referring to FIG. 3 more specifically now, this figure is a cross-sectional side view of a bearing-supported rotating union having a leakage sensor on the dry side of a labyrinth back-up seal as in FIG. 1, and having a sensor configuration according to an alternative embodiment of the invention. As with the union 1 of FIG. 1, the union 301 comprises a rotor 303 supported within housing 305 for rotation with respect to the housing 305 via a pair of ball bearing assemblies 327, 329. The other basic elements of the union are also similar to those of FIG. 1 and are labeled with like numbers to include: the internal passage 307, terminal end 309, rotating seal 311, stationary seal 313, stationary conduit 315, passage 317, annular space 319 surrounding the seals, back-up seal system 321, sensor element 325, electrical conduit 331 connected to the sensor element 325 for carrying a sense signal to a sense signal processing module 333, LED 335, second LED 337, and external conduit 339. The basic arrangement and functions of these elements is as described above.

In addition to these commonalities, there are several differences illustrated in FIG. 3 that should be noted. In FIG. 1, the sensor 25 is shown as being located between the nearest bearing assembly 29 (329) and the back-up seal system 21 (321). However, in the alternative embodiment of the invention illustrated in FIG. 3, the sensor 325 is located instead between the bearing assemblies 327, 329. In addition, the embodiment of the invention illustrated in FIG. 3 includes a filler element 343 which partially fills the annular space between the bearing assemblies 327, 329. This element 343 can be an annulus of material placed on the shaft 303 during installation of the bearing assemblies 327, 329. The filler element 343 serves to direct leakage into contact with the sensor 325 to ensure detection.

FIG. 4 is a cross-sectional side view of a bearingless rotating union illustrating features according to further embodiments of the invention. Although not critical to the invention, the back-up seal system of the union 401 of FIG. 4 comprises both a labyrinth 421 and an air curtain 422 to illustrate the variety of environments in which embodiments of the invention may be used. This combination shows one manner of combining two styles of barrier for additional leak protection.

More importantly, the union 401 of FIG. 4 illustrates an embodiment of the invention wherein an integrated sensor processing module 433 is used. In the illustrated embodiment of the invention, the module 433 is situated within the housing 405 in a cavity 406 formed therein. Although the location of the cavity is not critical and will depend upon individual component layout and locations for a particular union, the illustrated cavity 406 is shown opening to a surface 408 of the union 401 to facilitate installation, servicing, and visibility of LEDs 435, 437. The module 433 and LEDs 435, 437 operate in an embodiment of the invention as described above with respect to FIG. 1. Moreover the sensor 425 (25) and conduit 431 (31) continue to operate as described above with respect to other embodiments of the invention.

Although the sensor 425 is illustrated on the "dry side" of the air curtain 422 in FIG. 4, this location is not critical. In an alternative embodiment of the invention, the sensor 425 is located between the air curtain 422 and the labyrinth 421. In order to avoid further repetition, the remaining elements that FIG. 4 shares with other figures or that do not pertain to the invention will not be specifically labeled or discussed again at this point.

Figure 5:
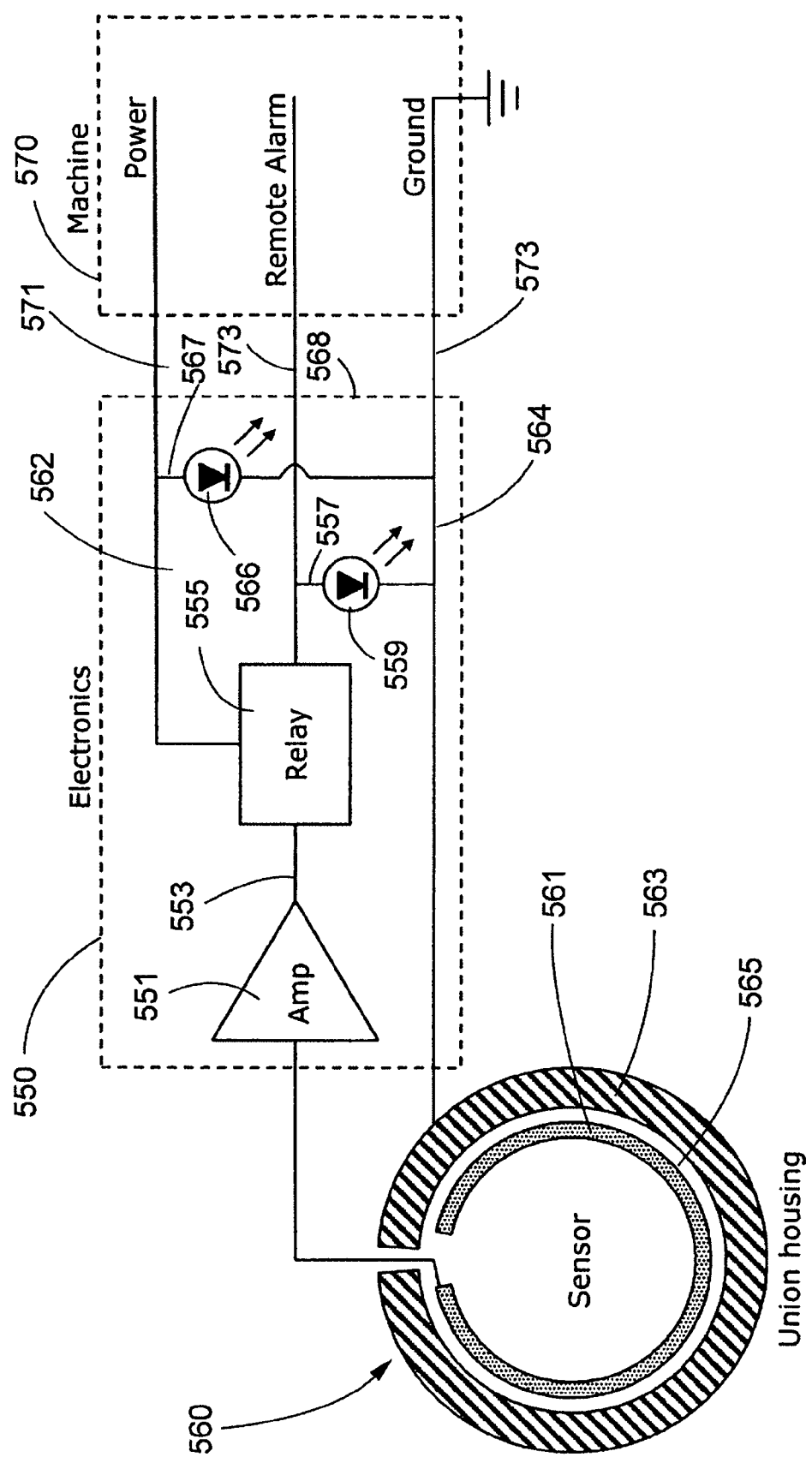
FIG. 5 is an electrical schematic diagram showing an exemplary sensor signal processing circuit according to an embodiment of the invention.

FIG. 5 is an electrical schematic diagram showing an exemplary sensor signal processing circuit 550 according to an embodiment of the invention in conjunction with the sensor/housing environment 560. In addition, the relationship of the aforementioned system to a machine environment 570 is shown. Beginning with the sensor/housing environment 550, this environment is preferably as described above, using a sensor conductor 561 (25 in FIG. 1) and housing 563 (5 in FIG. 1) configured and located as illustrated in any of FIGS. 1-4 or the accompanying descriptions. The illustrated gap 565 between the sensor conductor 561 and electrically conductive housing 563 is maintained by the intermittent insulator (not shown) on the sensor conductor 561 (203 in FIG. 2) as described in FIG. 2.

The sensor signal processing circuit 550 comprises an amplifier 551 for receiving and amplifying a voltage signal resulting from the current flow in the conductor 561 when leakage bridges the conductor 561 to the housing 563. The housing 563 is connected to ground 564. The output 553 of the amplifier 551 is received by a solid state relay 555. The relay 555 closes in response to the received input, connecting the input 557 of a leak-indicating LED 559 (35 in FIG. 1) to the voltage supply line 562. Since the output of the LED 559 is linked to ground 564, the LED lights in these conditions.

The sensor signal processing circuit 550 comprises a power-indicating LED 566 (37 in FIG. 1) for indicating to the operator that the circuit 550 is properly powered. The power-indicating LED 566 has its input 567 connected to the high voltage supply line 562 and its output 568 connected to ground 564. Thus, if the circuit 550 is receiving power via external power 571 and ground 573 leads, the power-indicating LED 566 will be lit. It will be appreciated that elements 571, 573, and 575 collectively correspond to element 41 in FIG. 1. Thus, if the power-indicating LED 566 is dark, the operator will be aware that the circuit 550 is not powered and cannot be relied upon for leak detection.

The machine environment 570 represents machinery associated with the rotating union comprising the sensor 561 and the sensor signal processing circuit 550. For example, the machine environment 570 may comprise a mill, lathe, printing presses, or other industrial environment. Although the machine environment 570 is illustrated as the source of power for the sensor signal processing circuit 550, such is not required. In addition, the sensor signal processing circuit 550 comprises, in an embodiment of the invention, an external link 575. The external link 575 may communicate with the machine environment 570 as shown in order to affect the machine operation (e.g., stop, start, or modify the machine operation in response to a signal from the sensor signal processing circuit 550) and/or to provide a remote leak indication at the machine environment 570, such as via a warning light, LED, or computer screen notification. In an embodiment of the invention the link 575 is wireless. Although the external link 575 is shown to carry the same signal as that driving the LED 559, in an alternative embodiment of the invention, the external link is provided with a signal other than that. For example, the signal on the external link 575 may be pulsed, inverted, or encoded.

In an alternative embodiment of the invention, a remote power indicator is provided so that the operator can remotely ascertain that the sensor signal processing circuit 550 is properly powered. In a further embodiment of the invention, an audible leakage warning is emitted by the sensor signal processing circuit 550 and/or remotely, such as at machine environment 570.

Although embodiments of the invention have been described with reference to a conductivity sensor that senses conductivity between a sensor element and a conductive housing, it will be appreciated that in an embodiment of the invention, the housing may be non-conductive. In this embodiment of the invention, a second conductive element may be provided in proximity to the sensor element such that any leakage will bridge the gap between the two resulting in current flow. The second conductive element may be of any suitable configuration, including that shown in FIG. 4 with respect to the sensor element. In an embodiment of the invention wherein the sensor and the second conductive element are ring-shaped, they may situated coaxially within the housing or otherwise.

Although the invention has been described in the context of a liquid coolant as the fluid being conveyed through the rotating union, it will be appreciated that the invention pertains to other fluids and semi-fluids (such as gaseous or misted substances) regardless of whether they serve a coolant function. It will be appreciated that a new and useful system for detecting leakage within a rotating union has been described herein. Preferred embodiments of this invention are described herein, including the best mode known to the inventors for carrying out the claimed invention. Variations of these preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

I claim:

1. A leak detecting system for a rotary union, the rotary union comprising a shaft rotatably supported within a housing, the shaft having therein a first passage for conducting a fluid axially through the shaft, wherein the shaft terminates within the housing at a terminal end exposing the first passage, wherein the rotary union further comprises a first annular seal element affixed to the terminal end, wherein the first seal element coaxially abuts a second annular seal element that is affixed about a second passage that is stationary with respect to the housing, the first and second seal elements normally sealing against each other such that the fluid passes between the second and first passages, the leak detecting system comprising:

a sensor element located within the housing and surrounding the shaft, the sensor element being configured to detect the fluid, if present, at any position surrounding the shaft; and at least one electrical conduit connected to the sensor element for carrying a signal indicating that the sensor element has detected the fluid at any position around the shaft.

2. The leak detecting system according to claim 1, wherein the rotary union further comprises a back-up seal surrounding the shaft and separating a first annular chamber containing the first and second seal elements from a second annular chamber, wherein the sensor element is located in the second annular chamber.

3. The leak detecting system according to claim 2, wherein the sensor element comprises a single sensing element configured as at least a substantial portion of a circular ring.

4. The leak detecting system according to claim 3, wherein the fluid is conductive and wherein the sensing element is a conductivity sensor.

5. The leak detecting system according to claim 4, wherein the sensing element comprises one or more insulated portions covered by an insulating material, and one or more exposed portions, such that the insulating material maintains the one or more exposed portions apart from the housing inner surface or other conductive surface.

6. The leak detecting system according to claim 5, wherein the housing is at least partly conductive and wherein the sensing element and the housing are maintained at two distinct electrical potentials, such that when a leaked amount of the fluid bridges at least one or more exposed portions to the housing inner surface, a detectable current flows in the sensing element.

7. The leak detecting system according to claim 4, wherein the rotor is rotatably supported within the housing by a plurality of bearing assemblies within the second chamber.

8. The leak detecting system according to claim 7, wherein the sensing element is located between two of the plurality of bearing assemblies.

9. The leak detecting system according to claim 8, further comprising a filler assembly positioned between the two bearing assemblies for directing leakage to the sensor element for detection.

10. The leak detecting system according to claim 7, wherein the sensing element is located between the plurality of bearing assemblies and the back-up seal.

11. A rotating union with integrated leakage sensing system, the union comprising:
a union housing;
a rotatably supported within the housing and having a rotor axis, the rotor having therein a first passage for conducting a fluid axially through the rotor, the rotor terminating within the housing at a terminal end sealed to a second passage such that the fluid can normally pass between the first and second passages;
at least one leakage sensor located within the housing to detect leakage of the fluid, each such leakage sensor substantially surrounding the rotor axis whereby it can detect leakage at any position around the shaft; and
a visual indicator mounted on the housing and linked to the at least one leakage sensor to indicate the presence of leakage of the fluid.

12. The rotating union according to claim 11, further comprising a second visual indicator mounted on the housing to indicate that the leakage sensor is operational.

13. The rotating union according to claim 11, wherein the visual indicator is an LED.

14. The rotating union according to claim 11, further comprising a link to activate an additional visual indicator that is remote from the rotating union.

15. The rotating union according to claim 14, wherein the link is a wireless link.

16. The rotating union according to claim 14, wherein the remote visual indicator is selected from the group consisting of a light, an LED, and a computer generated visual display.

17. The rotating union according to claim 11, wherein the leakage sensor utilizes a power source that is remote from the rotary union, further comprising a power visual indicator to indicate whether the remote power source is connected to the leakage sensor.

18. The rotating union according to claim 17, wherein the power visual indicator is remote from the rotary union.

19. The rotating union according to claim 17, wherein the power visual indicator comprises an LED.

20. A rotating union with integrated leakage sensing system, the union comprising:
a union housing;
a rotor rotatably supported within the housing, the rotor having therein a first passage for conducting a fluid axially though the rotor, the rotor terminating within the housing at a terminal end sealed to a second passage such that the fluid can normally pass between the first and second passages; and
a sense signal processing module integral with the housing to produce an electrical signal indicating the presence of unwanted leakage of the fluid at any position around the shaft.

21. The rotating union according to claim 20, further comprising at least one leakage sensor located within the housing for producing a leak detection signal, and being linked to the sense signal processing module.

22. The rotating union according to claim 21, wherein the sense signal processing module comprises an amplifier linked to the at least one leakage sensor to amplify the leak detection signal and a driver linked to the amplifier for receiving the amplified detection signal and causing a user-perceivable leakage indicator to be activated.

23. The rotating union according to claim 22, wherein the user-perceivable leakage indicator comprises the lighting of a visual signal device attached to the housing.

24. The rotating union according to claim 22, wherein the user-perceivable leakage indicator comprises the lighting of a visual signal device remote from the housing.

25. The rotating union according to claim 22, wherein the user-perceivable leakage indicator comprises the activation of an audible signal device attached to the housing.

26. The rotating union according to claim 22, wherein the user-perceivable leakage indicator comprises the activation of an audible signal device remote from the housing.

27. The rotating union according to claim 21, wherein at least one leakage sensor comprises a conductivity sensor.

28. The rotating union according to claim 20, wherein the sense signal processing module resides in a secondary housing affixed to the union housing.

29. The rotating union according to claim 20, wherein the sense signal processing module resides in a cavity within the union housing.

30. The rotating rotary union according to claim 20, wherein the sense signal processing module comprises a communications link connecting to a remote receiver.

31. The rotating union according to claim 30, wherein the communications link comprises a wireless link.

32. The rotating union according to claim 30, wherein the remote receiver is able to discontinue a process within which the rotary union is operating upon receipt of a signal from the sense signal processing module.

33. An orientation-independent leak detection system for rotary union having a shaft rotatably supported within a housing, the shaft having therein a first passage for conducting a fluid axially through the shaft, wherein the shaft terminates within the housing at a terminal end exposing the first passage, wherein the rotary union further comprises a first annular seal element affixed to the terminal end, wherein the first seal element coaxially abuts a second annular seal element that is affixed about a second passage that is stationary with respect to the housing, the first and second seal elements normally sealing against each other such that the fluid passes between the second and first passages, the orientation-independent leak detection system comprising:
a single substantially circular sensor element located within the housing and being to locate to directly detect leaking fluid without gravitational flow at any position about the axis of the shaft; and
at least one electrical conduit connected to the single substantially circular sensor element for carrying a signal indicating that the single substantially circular sensor element has detected fluid at any position around the shaft.

* * * * *